United States Patent [19]

Kulberg et al.

[11] E Re. 28,738

[45] Reissued Mar. 16, 1976

[54] QUENCH CORRECTION IN LIQUID SCINTILLATION COUNTING

[75] Inventors: Gerardus Huibrecht Kulberg, Amstelveen; Roedolf Hendrik Deinert, Mijdrecht, both of Netherlands

[73] Assignee: G. D. Searle & Co., Des Plaines, Ill.

[22] Filed: Aug. 19, 1974

[21] Appl. No.: 498,271

Related U.S. Patent Documents

Reissue of:

[64] Patent No.: 3,780,289
Issued: Dec. 18, 1973
Appl. No.: 225,234
Filed: Feb. 10, 1972

[52] U.S. Cl. ..... 250/362; 250/366
[51] Int. Cl.[2] ..... G01T 1/20
[58] Field of Search ..... 250/328, 252, 361, 362, 250/363, 366, 369, 207

[56] References Cited

UNITED STATES PATENTS

| | | | |
|---|---|---|---|
| 3,610,928 | 10/1971 | Thomas | 250/362 |
| 3,691,386 | 9/1972 | Cavanaugh, Jr. | 250/207 |
| 3,715,584 | 2/1973 | Rosentingl | 250/362 |

*Primary Examiner*—Davis L. Willis
*Attorney, Agent, or Firm*—Walter C. Ramm; Charles H. Thomas, Jr.; Peter J. Sgarbossa

[57] ABSTRACT

A means for determining counting efficiency in a liquid scintillation system. Pulse amplitudes are accumulated as are the number of pulses contributing thereto. The accumulated pulse amplitude sum is divided by the accumulated number of pulses to produce an average pulse amplitude for the pulses measured. The average pulse amplitude may be correlated to average detection efficiency by an ascertainable function. Through average efficiency of detection the actual rate of radioactive disintegrations may be computed from the count rate measured.

14 Claims, 4 Drawing Figures

QUENCH CORRECTION IN LIQUID SCINTILLATION COUNTING

Matter enclosed in heavy brackets [ ] appears in the original patent but forms no part of this reissue specification; matter printed in italics indicates the additions made by reissue.

This invention relates to quench correction in a liquid scintillation counting system.

BACKGROUND OF THE INVENTION

There are currently several commercial methods for determining efficiency in a liquid scintillation counting system. One widely used method is internal standardization. This technique consists of counting scintillations from radioactive events in a liquid sample to be analyzed, then adding a known amount of radioactivity in a compatible form. The sample with the increased radioactivity is then recounted. The efficiency is determined by dividing the count rate increment due to the internal standard by the known disintegration rate of the internal standard. Among the disadvantages associated with internal standardization is the requirement that each sample must be handled twice as well as the requirement that it be opened, with the possibility of alteration of counting efficiency due to spillage or evaporation. In addition, the sample is thereafter altered and cannot be recounted. Furthermore, each newly prepared standard solution must be compared to a permanent standard for continuity and each sample is subject to possible pipetting errors. Moreover, the precision of internal standardization falls off with increased color quenching, which is the internal absorption of some of the light produced by the scintillations in a colored sample solution.

An existing alternative to internal standardization is external standardization. External standardization requires, for example, an external standard of a source of gamma radiation of known radiation characteristics. Disintegrations from the liquid sample to be analyzed are first counted without the external standard. Thereafter the external standard is positioned near the liquid sample. The external standard emits gamma rays that induce scintillations by the scintillation fluor in the liquid sample. Calibration curves are constructed for each radioactive isotope serving as an external standard and for a particular scintillation fluor in each solvent system by means of a set of standard samples containing known amounts of radioactivity in various concentrations of quench covering the useful efficiency range. The count rate produced by the external standard in each sample analyzed can then be correlated with the efficiency of detection. If a low energy gamma emitter is used as an external standard, however, it is necessary to subtract the contribution of the sample isotope that falls in the energy range in which the external standard is being counted. Also, there is considerable variation in the measured count of an external standard depending upon sample vial volume and shape, volume of liquid in the sample vial, and position of the external standard with respect to the vial.

Still another method of obtaining efficiency is through the sample channels ratio method. Since quenching effects the average photon yield per disintegration, the pulse amplitude distribution varies with degree of quenching. Two counting energy windows may be positioned, relative to the pulse amplitude spectrum, such that the ratio of the net count rates in the two windows can be made to vary monotonically with the degree of quenching. A calibration curve relating the ratio of the channel net count rates to isotope counting efficiency can then be constructed. Because sample channels ratio involves the ratio of the counts in two amplitude windows, this technique becomes very unreliable for highly quenched samples, since very few pulse counts then appear in the upper channel.

SUMMARY OF THE INVENTION

An object of the present invention to determine the efficiency of pulse detection based on apparent pulse amplitude rather than upon the channels ratio.

It is another object of this invention to determine average detection efficiency utilizing the entire spectrum of pulse amplitudes and pulse counts. This is in contrast to conventional methods where the precision of measurement of efficiency is poor for highly quenched samples and for high energy standards.

It is another object of the invention to determine efficiency using a single correlation function involving pulse amplitude for a given radioactive source in a given liquid scintillation counting device. A single function currently is insufficient where distinct channels ratio-efficiency curves must be produced experimentally for each radioactive source and solvent system utilized in a detecting device.

In one broad aspect this invention is a method for determining counting efficiency using a liquid scintillation radiation detecting and counting apparatus having pulse amplitude accumulative means for pulses generated by photodetecting means as a result of scintillations caused by radioactive events in a liquid sample containing a known radioactive source comprising: passing the aforesaid pulses to said pulse amplitude accumulative means to produce a cumulative integral sum of pulse amplitudes, counting the number of pulses contributing to the cumulative integral sum of pulse amplitudes, dividing the integral sum of pulse amplitudes by the number of pulses to ascertain an average pulse amplitude, and determining average pulse collection efficiency as a function of average pulse amplitude.

In another aspect this invention is, in a liquid scintillation radiation detecting and counting device having a scintillation chamber, at least one photodetector in optical communication with said scintillation chamber, the improvement comprising an analog to digital converter operatively connected to said photodetector, a pulse amplitude cumulative register connected to said analog to digital convertor, a pulse count cumulative register connected to said analog to digital convertor, and dividing means connected to said pulse amplitude cumulative register and to said pulse count cumulative register for dividing cumulated pulse amplitudes by cumulated pulse counts to produce an average pulse amplitude.

DETAILED DESCRIPTION

The method and device of this invention are more clearly illustrated in the accompanying drawings in which.

Figure 1:
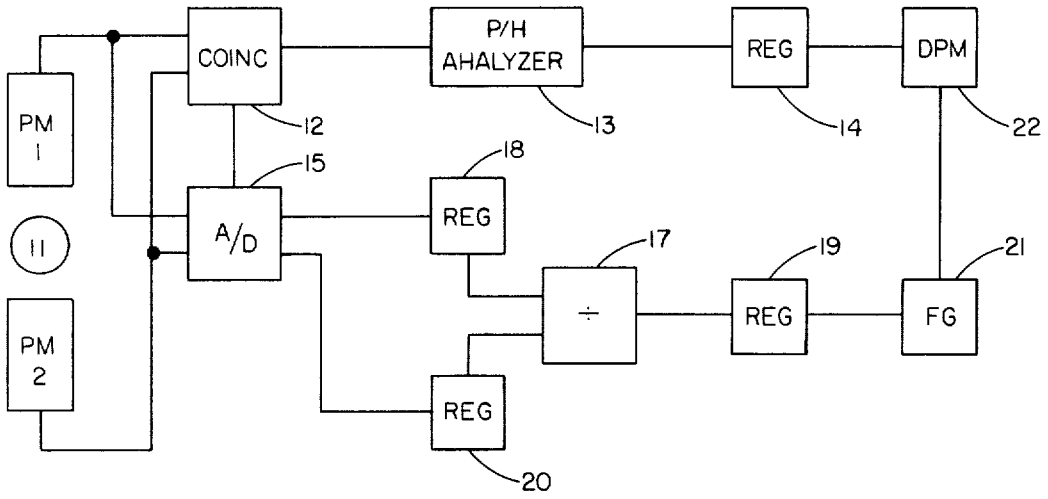
FIG. 1 is a block diagram of a liquid scintillation coincidence counting system employing the present invention.

Referring now to FIG. 1 there is shown a liquid samle 11 containing a known radioactive source of unnown level of radioactivity positioned in a scintillation hamber. Photomultiplier tubes PM1 and PM2 are in ptical communication with the sample 11 in the scinllation chamber. PM1 and PM2 are both connected to coincidence detector 12, the output of which is conected to a conventional pulse height analyzer 13 and ıereafter to a pulse count register 14. The part of the ystem described thus far is a conventional arrangeıent for liquid scintillation coincidence counting. In ddition, the photomultiplier tubes PM1 and PM2 are oth connected to an analog to digital converter 15 hich is gated by the coincidence detector 12 so that on-coincident counts do not contribute to the deterıination of efficiency. In a single detector system, all f the single detector output pulses are processed by ıe pulse height analyzer 13 and the analog to digital onverter 15. A pulse amplitude cumulative register 18 ı the form of a scaler and a pulse count cumulative egister 20 also in the form of a scaler, are both conected to outputs of analog to digital converter 15. The nalog to digital converter 15 processes the pulses from M1 and PM2 and generates signals representing pulse mplitudes which are passed to register 18 for storage. f course, register 18 is not reset until after the countıg cycle for a particular sample is complete. Signals epresenting pulse counts are passed from analog to igital converter 15 to register 20 for accumulating otal pulse count. In the preferred embodiment, regisers 18 and 20 display a digital representation of accuıulated pulse amplitude and cumulative pulse counts espectively. Alternatively, the registers 18 and 20 eed not provide a digital display, but may be included ıerely as a part of the dividing means 17 as long as hey are not cleared, but only updated to facilitate ivision in determining efficiency for a given sample. he dividing means 17 is connected with inputs from oth the registers 18 and 20. The dividing means 17 ivides cumulated pulse amplitudes from register 18 by umulated pulse counts from register 20, to produce an verage pulse amplitude which is passed to the average ulse amplitude register 19 connected to the dividing ıeans 17. To the average pulse register 19 is conected a function generator 21. Function generator 21 pplies a function to the average pulse amplitude to rrive at pulse detection efficiency. This resultant pulse etection efficiency, or the inverse thereof, is passed to data output means in the form of a disintegration egister 22 connected to function generator 21 for etermining the rate of radioactive disintegrations ased on pulse detection efficiency. That is, measured ounts from register 14 are divided by average pulse etection efficiency in order to compute the number of ctual radioactive disintegrations in the sample 11.

Figure 3:
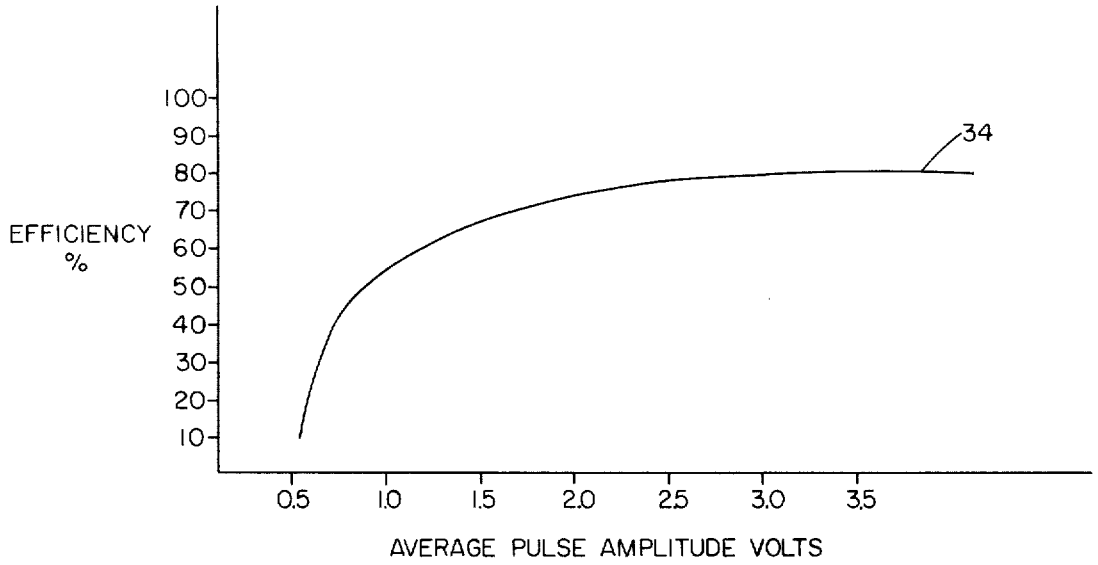
FIG. 3 is a plot of efficiency versus average pulse nplitude.

In one embodiment of the invention, the function pplied to the average pulse amplitude to obtain the ulse detection efficiency is illustrated in FIG. 3. In this mbodiment the function generating means 21 is comrised of analog components with a voltage response pproximating the curve 34 in FIG. 3. In such a contruction efficiency as a function of average pulse amplitude rises sharply at low pulse amplitudes as depicted by the curve 34. Detection efficiency levels off rapidly at the higher average pulse amplitude energy levels. The curve 34 in FIG. 34 in FIG. 3 is a composite for both tritium and carbon 14, the radioactive sources most frequently used in liquid scintillation counting. There is some difference in the correlation of efficiency to average pulse height for the two isotopes, so it may be desirable for the liquid scintillation device to operate with separate function generating means depending upon the radioactive source where maximum accuracy is desired. This would be somewhat similar to existing liquid scintillation counting methods since most of these operate in distinct modes for different radioisotopes.

Figure 2:
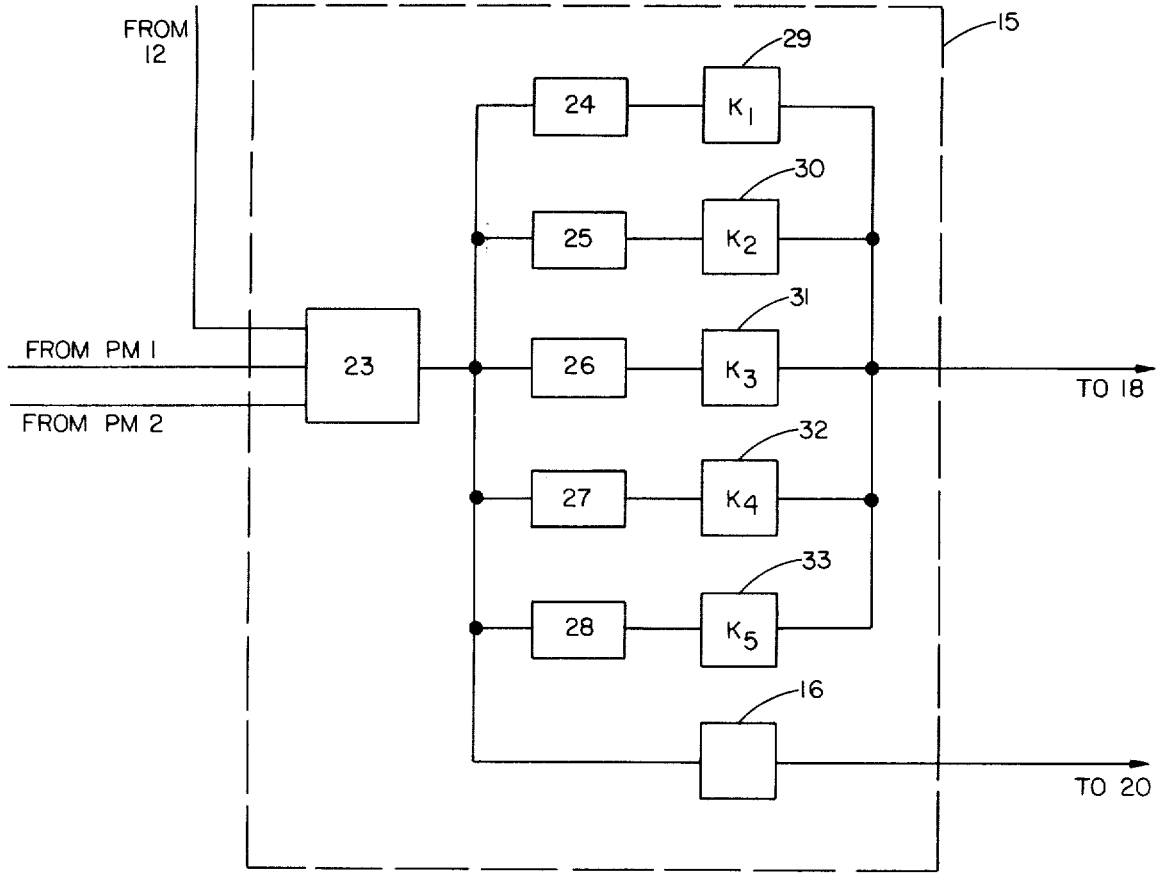
FIG. 2 is an expanded block diagram of a portion of ıe liquid scintillation system of FIG. 1.

In an alternative arrangement, such as the embodiment illustrated in FIGS. 1 and 2, the function generating means 21 may be comprised of a linear amplifier. In such an arrangement, the function applied to the average pulse amplitude is a linear function. While this would normally result in an inaccurate determination of efficiency, the situation can be rectified by arriving at weighted values of the pulse amplitudes in the analog to digital converter 15 through the use of a transfer function F(a). The weighted average pulse amplitude values $\overline{a}_1$, are then equal to $K \cdot F(a)$, where K is a constant and a is the value of amplitude sums of coincident pulses passed to the analog to digital converter 15. The weighted pulse amplitude values are passed to register 18 from analog to digital converter 15. FIG. 2 illustrates a form of the analog to digital converter 15 wherein such weighted values or pulses amplitudes are utilized. In the analog to digital converter 15, pulses from PM1 and PM2 are passed to a summing means 23 which when gated by coincidence detector 12, adds together the pulse amplitudes of the two coincident pulses. The signal from summing means 23 is passed through a plurality of amplitude sensitive pulse weighting means each of which is comprised of a pulse height analyzer and a function generator, and which together serve to apply a transfer function to the pulse amplitude sums. Each of the pulse height analyzers 24, 25, 26, 27, and 28 has a distinct pulse amplitude window, so that the transfer function parameters vary between ranges of pulse amplitude limits, depending upon the window within which a particular pulse amplitude sum lies. The pulse amplitude windows cover the entire spectrum of pulse amplitude, from threshold coincidence to infinity, but do not overlap. The simplest form of function generator is a linear amplifier, such as the linear amplifiers 29, 30, 31, 32 and 33 having respective gains of $k_1$, $k_2$, $k_3$, $k_4$, and $k_5$. A particular pulse amplitude sum emanating from summing means 23 will thereby pass through one and only one of the pulse height analyzers 24 through 28 to reach a function generator. For example, if a pulse amplitude sum falls within the pulse window of pulse height analyzer 27, the pulse amplitude sum will be passed through pulse height analyzer 27 and subjected to a gain of $k_4$ as imposed by function generator 32. The pulse amplitude sum, weighted by a factor of $k_4$, is then passed to the pulse amplitude cumulative register 18. The pulse signal indicating a coincident pulse count is also passed from summing means 23 through a pulse shaping network 16 to the register 20.

Figure 4:
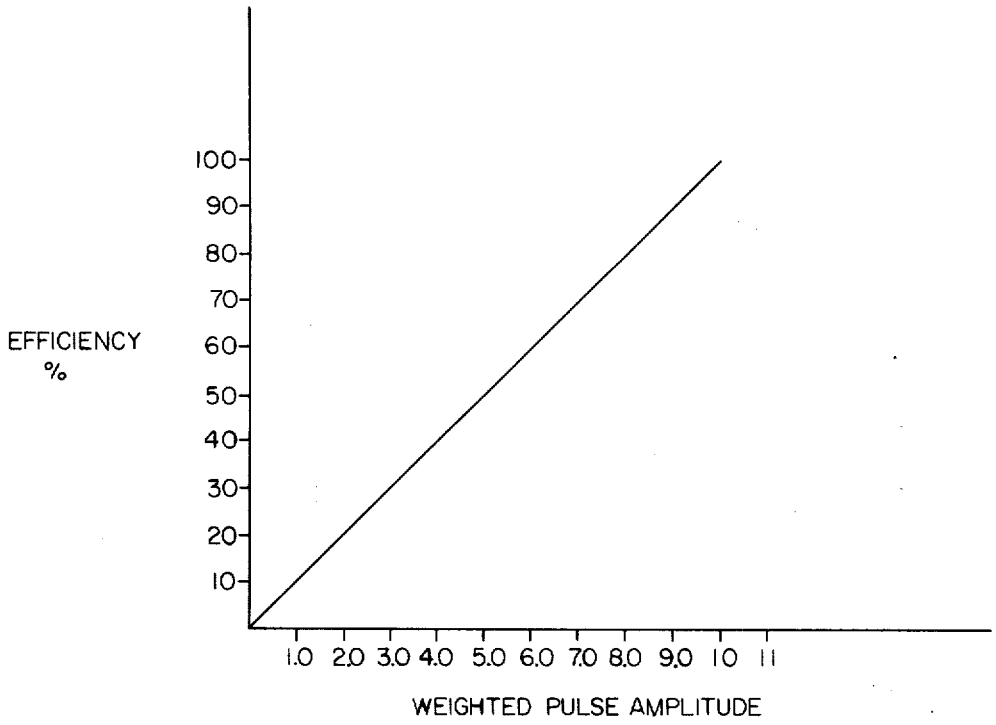
FIG. 4 is a plot of efficiency versus weighted average ulse amplitude.

It can be seen that in order to linearize the function applied to the average pulse amplitude from register 19 by function generating means 21, such as illustrated in FIG. 4, a very low weighting will be applied in the analog to digital convertor 15 to large pulse amplitude sums while a much higher weighting will be applied to smaller pulse amplitude sums. While the function generators 29, 30, 31, 32, and 33 have been described as linear amplifiers, linear amplifiers only approximate the appropriate weighting which should be applied to the pulse amplitude sums. For greater accuracy, function generators producing a more intricate transfer function may be utilized to more accurately arrive at the proper weighted cumulative integral sum of pulse amplitudes.

In the embodiment of the invention depicted in FIGS. 1 and 2, coincident pulses generated by the photomultiplier tubes PM1 and PM2 as a result of scintillations caused by radioactive events in the liquid sample 11 are passed to the analog to digital converter 15. If the pulses are in fact coincident, the analog to digital converter 15 is gated. The pulse amplitude cumulative register 18 increments or initiates the cumulative integral sum of pulse amplitudes. The cumulative integral sum of pulse amplitudes is continuously available as an input to the dividing means 17 from the register 18. Similarly, the number of individual pulses occurring in coincidence which contribute to the cumulative integral sum of pulse amplitudes is initiated or incremented by the pulse count cumulation register 20. The pulse count also is continuously supplied as an input to the dividing means 17 from the register 20.

When each of the registers 18 and 20 is updated, the dividing means 17 performs a mathematical division of the accumulative integral sum of pulse amplitudes by the accumulated pulse count of pulses contributing to the integral amplitude sum. The quotient obtained is the average pulse amplitude of the coincident pulses measured. This average pulse amplitude is passed to the average pulse amplitude register 19 connected to the dividing means 17. In an alternative mode of operation, no division is performed until after a predetermined elapsed time or until a predetermined number of counts have been accumulated, after which a single operation or mathematical division is performed for a sample to arrive at an average pulse amplitude for that sample. In either case, the average pulse amplitude is used to determine average pulse collection efficiency through the use of function generating means 21 as previously described. The function generated by function generating means 21 may be either mathematically or empirically derived. If the function is mathematically derived and weighted pulse amplitude sums are not used, an appropriate function would be typified by the function: $E=C\bar{a}^{1/2}-b$, where E is average efficiency of detection, C and b are constants, and $\bar{a}$ is average pulse amplitude. Such a function may be used to approximate the curve 34 of FIG. 3 in situations where only actual pulse amplitudes, not weighted pulse amplitudes, are derived from analog to digital converter 15.

If the function utilized is mathematically derived, the function generating means 21 may generate a function that has parameters that vary as between ranges of pulse amplitude limits. Such a function generating means would not then produce a signal from a single set of components such as is possible with the function $E=C\times\bar{a}^{1/2}-b$, but rather would be constructed more nearly analogous to the system depicted in FIG. 2.

Where the function is to be empirically derived, the function is determined by selecting a plurality of standard liquid samples quenched to varying degrees, each sample containing the radioactive source to be used in the test samples, but at known levels of radioactivity. The rate of detection of radioactive events is measured using the liquid scintillation and coincidence counting apparatus of FIG. 1. The average pulse collection efficiency is calculated in each instance by dividing the rate of detection of radioactive events by the known level of radioactivity. The average measured pulse amplitude in each of the standard liquid samples is plotted against average efficiency in a two-dimensional coordinate system to locate points conforming to the function to be defined. With a sufficient number of points located, the function may be defined to include the corresponding values of pulse collection efficiency and average pulse height for the standard liquid samples. Analog components may be selected to approximately generate the function so derived.

The foregoing description and preferred embodiments of the invention have been depicted for illustrative purposes only, and the particular mode of operation or embodiment or component used should not be considered limiting as to the scope of the invention. For example, a separate average pulse amplitude register 19 is not essential to the invention when either a disintegration register 22 or an efficiency register is utilized. Also, it may be desirable for various of the operating elements to perform multiple functions. For example, while the coincidence detector 12, the pulse height analyzer 13, and the pulse count register 14 are depicted herein as separate units, these devices may easily be combined with the analog to digital conversion channel. In such an arrangement, a single pulse count register could perform the functions of both of the pulse count registers 14 and 20. In addition, the pulse height analyzer 13 could be deleted with its effective function being taken over by the properties of the analog to digital converter 15.

We claim:

1. A method for determining counting efficiency using a liquid scintillation radiation detecting and counting apparatus having [ pulse amplitude accumulative means for pulses generated by photodetecting means as a result of ] *photodetecting means responsive to* scintillations caused by radioactive events in a liquid sample containing a known radioactive source *to generate pulses having an amplitude spectrum, and pulse amplitude accumulative means*, comprising: passing the aforesaid pulses to said pulse amplitude accumulative means to produce a cumulative integral sum of pulse amplitudes *ranging upwardly from a* detection threshold, counting the number of pulses contributing to the cumulative integral sum of pulse amplitudes, dividing the integral sum of pulse amplitudes by the number of pulses to ascertain an average pulse amplitude, and determining average pulse collection efficiency as a function of said average pulse amplitude.

2. The method of claim 1 wherein average pulse collection efficiency is determined from an empirically derived function.

3. The method of claim 1 wherein average pulse collection efficiency is determined from a mathematically derived function using said liquid scintillation radiation detecting and counting apparatus.

4. The method of claim 3 wherein said mathematically derived function has parameters that vary between ranges of pulse amplitude limits.

5. The method of claim 1 wherein said function is a inear function, and wherein the pulse amplitudes of he pulses passed to said pulse amplitude accumulative neans are weighted according to a transfer function in ırriving at the aforesaid cumulative integral sum of ›ulse amplitudes, whereby the aforesaid linear function ıccurately reflects the actual relationship of average ›ulse collection efficiency to the aforesaid average ›ulse amplitude.

6. The method of claim 5 wherein said transfer func-ion has terms that vary as between distinct and differ-ɜnt pulse amplitude ranges.

7. The method of claim 1 further comprising thereaf-er determining the rate of occurrence of disintegra-ions based on the average pulse collection efficiency.

8. A method of compensation for quenching of liqui-ied radioactive scintillation samples using a liquid ;cintillation radiation detecting and counting apparatus ıaving photodetecting means, a function generating neans, and a data output means, comprising: detecting ;cintillations caused by radioactive events in a liquified ·adioactive scintillation sample, generating electrical ›ulses in said photodetecting means *having an ampli-ude spectrum* in response to scintillations caused by ·adioactive events in said sample, adding and accumu-ating the pulses *ranging upwardly in amplitude from detection threshold* to produce an accumulated integral amplitude sum, dividing said integral amplitude sum by :he number of pulses contributing thereto, generating a ;ignal proportional to the resulting quotient representa-:ive of an average pulse amplitude, passing said average ›ulse amplitude signal to a function generating means :o produce a signal representative of average pulse :ollection efficiency, and passing said average pulse :ollection efficiency signal to said data output means.

9. In a liquid scintillation radiation detecting and :ounting device having a scintillation chamber, at least one photodetector in optical communication with said ;cintillation chamber *and generating pulses having an amplitude spectrum*, the improvement comprising: an analog to digital converter operatively connected to said photodetector, a pulse amplitude cumulative regis-ter connected to said analog to digital converter *and responsive to said pulses having amplitudes above a de-tection threshold*, a pulse count cumulative register :onnected to said analog to digital converter, and di-viding means connected to said pulse amplitude cumu-lative register and to said pulse count cumulative regis-ter for dividing accumulated pulse amplitudes by cu-mulated pulse counts to produce an average pulse am-plitude.

10. In a liquid scintillation radiation detecting and counting device having a scintillation chamber, at least one photodetector in optical communication with said scintillation chamber *and generating pulses having an amplitude spectrum*, the improvement comprising: ana-log to digital converter means operatively connected to said photodetector for producing signals representing pulse amplitudes and signals representing pulse counts, an accumulative register connected to said analog to digital converter for storing the total sum of signals representing *all* pulse amplitudes *in said spectrum above the detection threshold*, an accumulative register con-nected to said analog to digital converter for storing the total sum of signals representing pulse counts, dividing means connected said accumulative register for pulse amplitudes and to said accumulative register for pulse counts for dividing cumulated pulse amplitudes by cumulated pulse counts to produce an average pulse amplitude, and a function generator operatively con-nected to said dividing means for applying a function to said average pulse amplitude to arrive at pulse detec-tion efficiency.

11. The improved device of claim 10 wherein said pulse amplitude analog to digital converter further comprises amplitude sensitive pulse weighting means operative according to a mathematical transfer func-tion with parameters that vary between ranges of pulse amplitude limits, and wherein said function generator applies a linear function to said average pulse ampli-tude.

12. The improved device of claim 10 further com-prising a disintegration register connected to said func-tion generator for determining the rate of radioactive disintegrations based on pulse detection efficiency.

13. In a liquid scintillation radiation detecting and coincidence counting device having a scintillation chamber, a plurality of photodetectors in optical com-munication with said scintillation chamber *and generat-ing pulses having an amplitude spectrum*, and a coinci-dence detector connected to said photodetector, the improvement comprising: analog to digital converter means operatively connected to said photodetectors and to said coincidence detector for producing *first* signals representing pulse amplitudes *ranging upwardly from threshold coincidence* and *second* signals represent-ing *the corresponding* pulse counts, [ an ] *a first* accu-mulative register connected to said analog to digital converter for storing the total sum of *said first* signals representing *the cumulated value of said* [ pulse ] am-plitudes, [ an ] *a second* accumulative register con-nected to said analog to digital converter for storing the total sum of *said second* signals representing *the cumu-lated value of said* pulse counts, dividing means con-nected to said *first* accumulative register [ for pulse amplitudes ] and to said *second* accumulative register [ for pulse counts ] for dividing *said* accumulated pulse amplitudes by *said* cumulated pulse amplitudes by *said* cumulated pulse counts to produce an average pulse amplitude, and a function generator operatively connected to said dividing means for applying a func-tion to said average pulse amplitude to arrive at pulse detection efficiency.

*14. The improved device of claim 13, wherein said first signals produced by said analog to digital converter means represent pulse amplitudes ranging from threshold coincidence to infinity.*

* * * * *